Nov. 6, 1934.  F. A. ENGEL ET AL  1,979,255
PIPE JOINT PACKING DEVICE
Filed April 28, 1932    4 Sheets-Sheet 1

INVENTORS
Frank A. Engel
Frank V. Lawrence
Franklin Hudson
BY
S. J. Cox
ATTORNEY Nov. 6, 1934.  F. A. ENGEL ET AL  1,979,255
PIPE JOINT PACKING DEVICE
Filed April 28, 1932   4 Sheets-Sheet 2
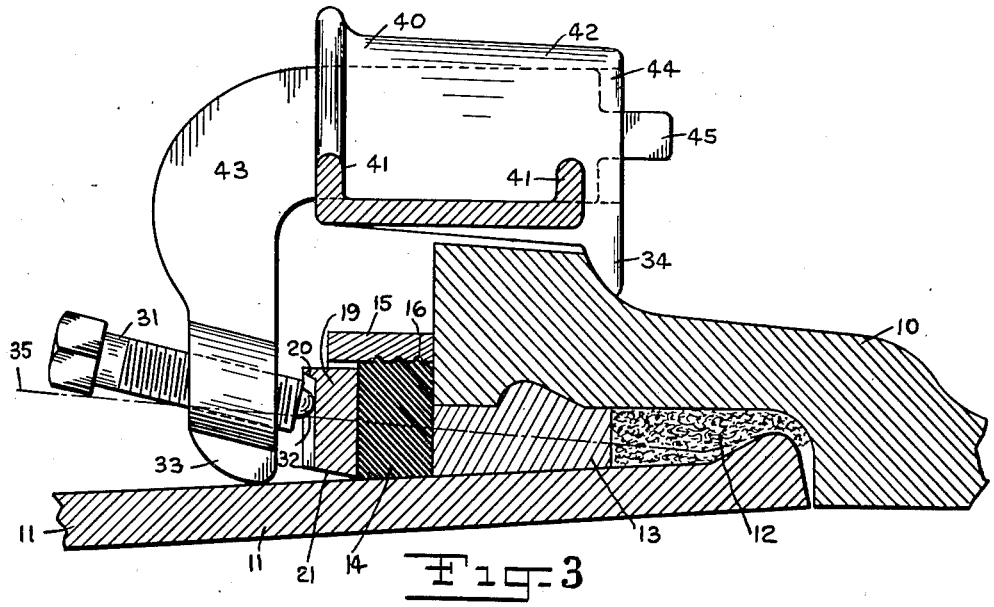
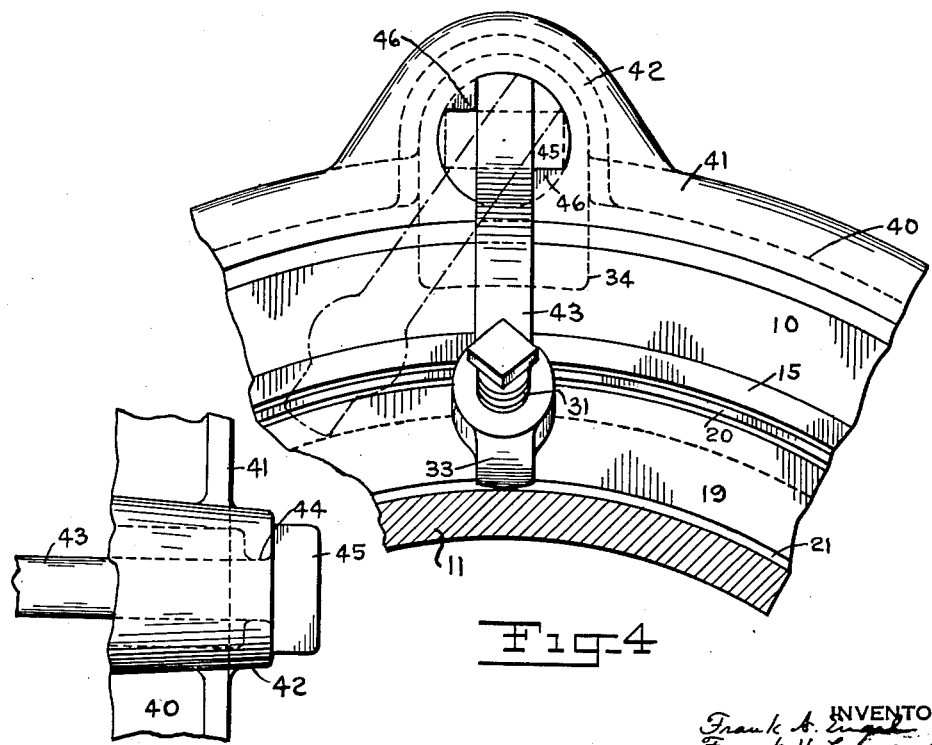

Nov. 6, 1934.   F. A. ENGEL ET AL   1,979,255
PIPE JOINT PACKING DEVICE
Filed April 28, 1932   4 Sheets-Sheet 3
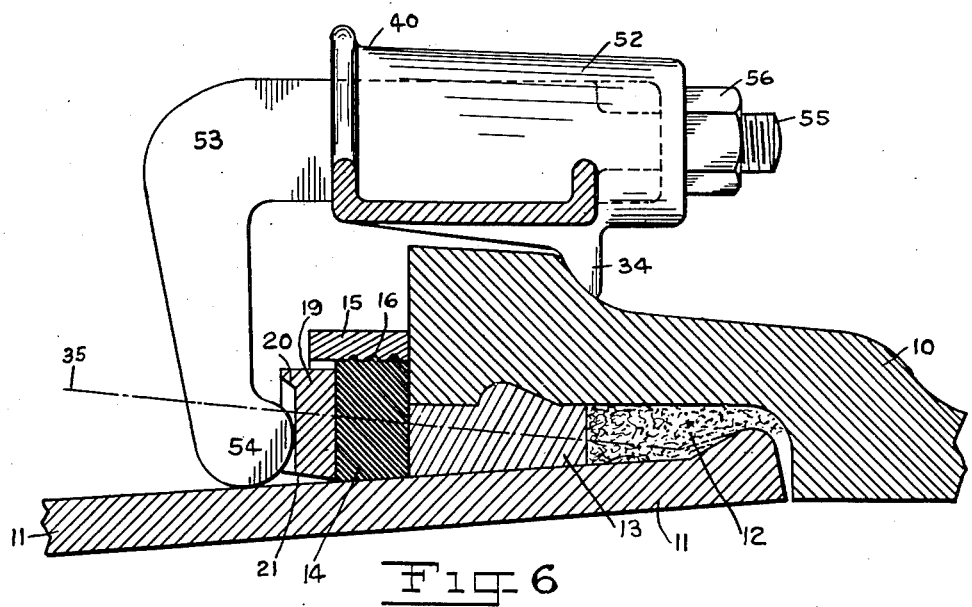
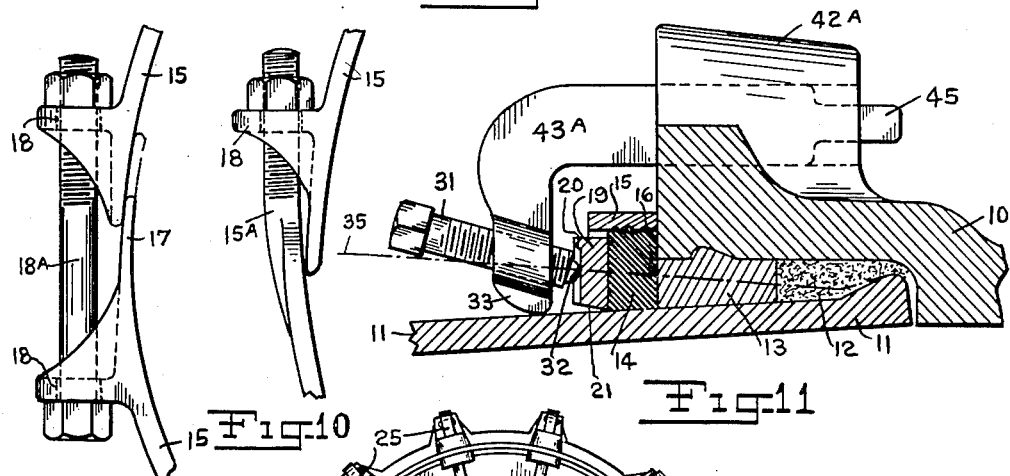
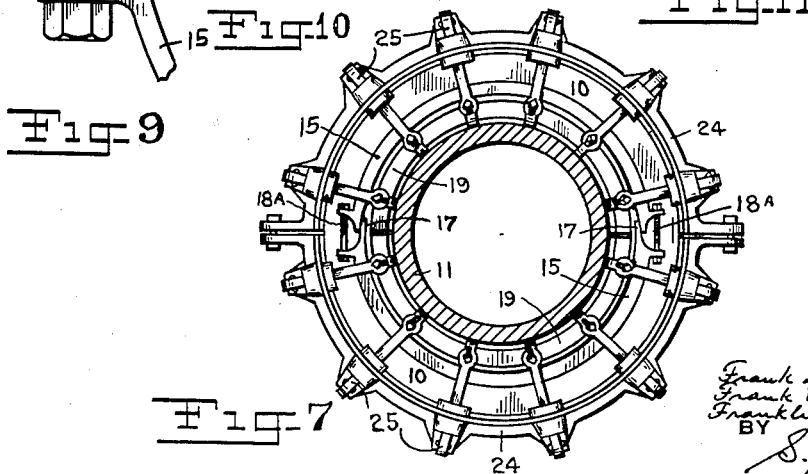

Patented Nov. 6, 1934

1,979,255

UNITED STATES PATENT OFFICE 1,979,255

PIPE JOINT PACKING DEVICE

Frank A. Engel, Roselle Borough, Frank V. Lawrence, Plainfield, and Franklin Hudson, Roselle Borough, N. J., assignors to Inner-Tite Clamp Corporation, Elizabeth, N. J., a corporation of New Jersey Application April 28, 1932, Serial No. 607,920

20 Claims. (Cl. 285—119)

The present improvements relate, in general, to pipe joints and more particularly to a clamp for such joints to insure an effective seal and to prevent leakage about the joint.

A primary object of the improvements, among others, is to provide an improved clamp which is easy to apply, provides a more effective seal, has a long life and is dependable.

A further object is to provide a novel clamp adaptable for use with straightaway pipe sections either concentrically or eccentrically aligned, or with pipe sections disposed at an angle to each other, as in the case of a gradual curve.

Another object of the improvements is to provide a clamp device which is adapted for use with bell and spigot type joints, will provide an effective seal therefor and will not be impaired or require service in the event the pipe sections move from their initial position.

A further object is to provide a novel adjustable clamp adaptable for a plurality of applications and uses.

The provision of improved sealing means, of new and effective details of construction as well as the improvement of this class of device in general, constitutes further objects of the invention. Other objects and advantages will be apparent upon reference to the accompanying specification and drawings, in which—

Fig. 2 is an end elevation of the structure of Fig. 1;

Fig. 3 is a view similar to Fig. 1 illustrating a modified form;

Fig. 4 is an end elevation of the structure of Fig. 3;

Fig. 5 is a plan of a detail of the structure in Fig. 3;

Fig. 6 is a view of another modified form;

Fig. 7 is an end elevation, reduced in scale, of one form of the clamp in association with a bell and spigot joint;

Figs. 8 and 9 are details of the sealing members;

Fig. 10 is a modification of the type of connection illustrated in Fig. 9;

Fig. 11 is a section, on a smaller scale, of another adaptation of the present improvements;

Attention is invited to the copending application of Frank A. Engel, Serial No. 570,386, filed October 22, 1931, of which this application is in the nature of an improvement. In that application a novel clamp is disclosed for use primarily in connection with straightaway pipe sections, although its use is not limited thereto.

Figure 1:
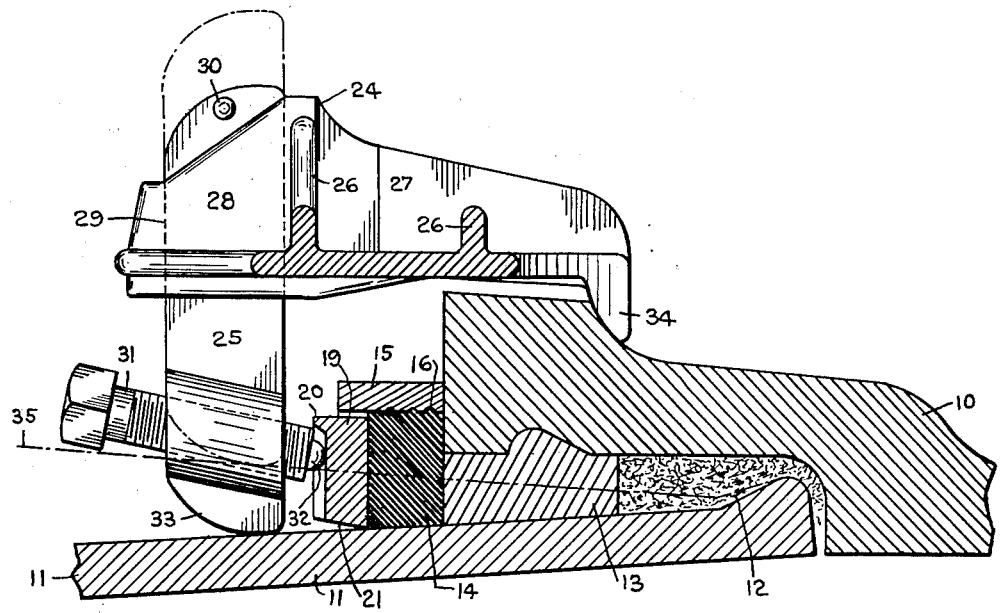
Fig. 1 is a longitudinal half section of a bell and spigot joint illustrating one form of the present improvements associated therewith.

In the present improvements, the clamp is intended primarily for use in connection with eccentric or angularly disposed pipe sections, although its use and application is not limited thereto. Referring to the drawings, the form of the improvements in Fig. 1 is illustrated in connection with bell and spigot pipe sections 10 and 11 disposed at an angle to each other, wherein a packing of caulking yarn 12 and lead 13, or other suitable materials is disposed in the manner illustrated. The bell end is provided with the usual annular flange or shoulder as in common in this type of joint.

An annular gasket or packing ring 14 of one or more parts, composed of rubber or other suitable compressible material, is provided about the spigot section 11, and engages the lead seal 13 and the end of the bell section having a snug fit therewith. As illustrated, the gasket is preferably of rectangular or square cross section and is encircled by a collar or keeper ring 15 which may be in one or more sections. The inner periphery of the ring is provided with means for preventing relative movement thereof and may take the form of raised or countersunk members. In the present embodiment the inner face is equipped with one or more circumferential grooves 16, into which the rubber of gasket 14 may be pressed in the nature of a tongue.

Any conventional means may be provided for securing the ring 15 in position about the gasket although that illustrated in Fig. 9 is preferable. In that form, one end of the ring is extended to provide a tongue 17 which is overlapped by the adjacent end of the ring so as to completely encircle the gasket, provide initial compression thereon throughout the extent of the gasket, and maintain uniform sealing pressures. The eyes 18 for receiving the bolt 18A are formed by curved brackets which are so shaped and afford sufficient internal clearances to allow the bolt to take any angular adjustments that may be necessary. It is seen that the ring may be used with pipes of varying diameters and upon reference to Fig. 9, the range of adjustment is shown in dotted lines.

A modified form of union is illustrated in Fig. 10, wherein the screw-threaded reduced end 15A integral with the ring, dispenses with one of the eyes of the prior form, and eliminates the use of separate bolts which may be unhandy to assemble, or may become lost.

An annular pressure ring 19, of one or more sections completes the enclosure for the gasket 14. The exposed face of this ring is provided with an annular flange 20, for centering purposes as hereinafter described. A similar result may be attained by otherwise modifying the face of the ring, as for example, by means of an annular groove 64, countersunk in the central portion of the face (Figs. 12 and 13) or by spaced recesses of suitable dimensions. It is noteworthy that the inner edge of the ring 19, adjacent the spigot section, is bevelled at 21, so that the full area of the inner face of the ring may be effective against the gasket. Upon reference to Fig. 8, it will be seen that the adjoining ends of the ring are dovetailed by tongue 22 and groove 23.

The foregoing elements may be substantially the same in all embodiments of the invention illustrated. These sealing and packing elements are maintained in position and an efficient seal is effected by means of a clamp ring and adjustable arms carried thereby. Referring more particularly to the form illustrated in Figs. 1 and 2, the clamp ring 24 and adjustable arm 25 is seen in operative position about the bell and spigot sections. The ring 24 comprises two or more similar sections which provide an annular member suitably joined by bolts or the like as seen in Fig. 7, as well as in the aforementioned copending application. A suitable number of arms 25 are conveniently spaced about the ring 24.

As illustrated, the clamp ring 24 is strengthened and braced by circumferential ribs 26 and transverse ribs 27. The latter are enlarged somewhat to provide upstanding rectangular housings 28 for the reception of the adjustable arms. This housing as well as the clamp ring is provided with a radially disposed aperture 29 in which the adjustable arm 25 is disposed, having a close and nice fit with the walls of the housing. The foremost circumferential rib 26 merges with the housings 28 and braces them. Furthermore, both the ribs 26 function to resist any unbalanced hoop action or torque caused by the reactions of screws 31 and lugs 34. As illustrated, the arm 25 is slidably connected with the ring 24, having the studs 30 and screw 31 to prevent its complete dropping out. The screw 31 has screw threaded engagement with the arm 25 and terminates in a ball tip 32 adapted to engage the pressure ring 19. The lower edge of the arm is rounded as at 33 to accommodate adjustments and angular positioning of the pipe sections.

Figures 2, 8:
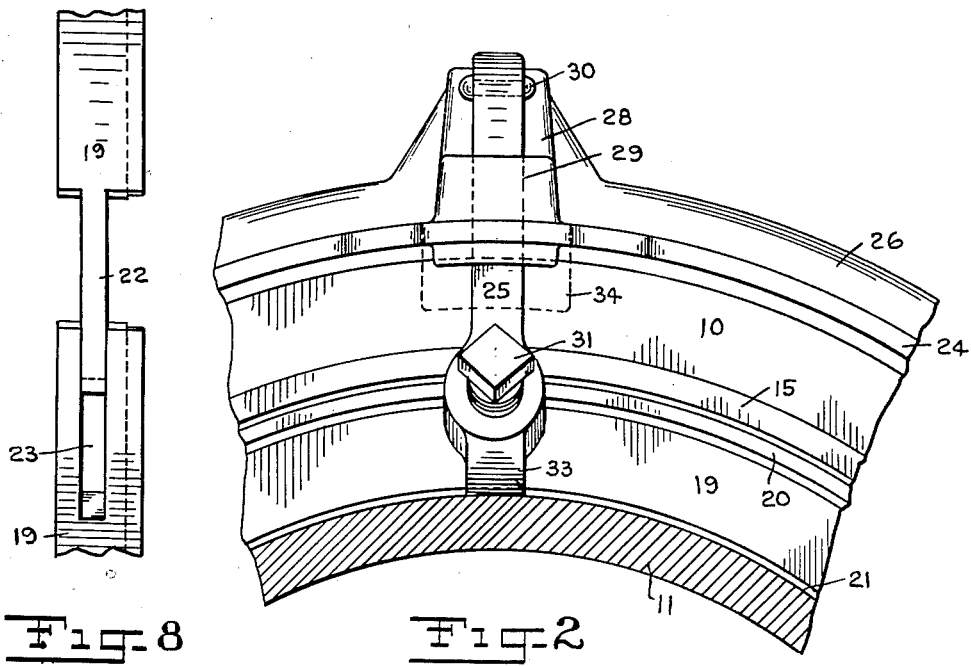

While only a segment of the improved clamp is illustrated in Figs. 1 and 2, it is understood that the ribs 27, housings 28, and arms 25 are provided at spaced points about the ring as seen in Fig. 7. Opposite each such housing and aligned with each rib 27, so as to be, in effect, a continuation thereof, is a lug 34, which projects downwardly and is adapted to engage the flange or shoulder of the bell section 10. From these housings 28 and lugs 34, the clamp ring 24 recedes toward the circumferential ribs 26, so that in plan, the ring presents escalloped edges. Such a form is manifestly in the interests of lightness and economy of material, although either or both edges of the ring may be of undeviating form, so that the entire ring has the same width throughout, or has one edge thereof without indentations.

In such event, the lugs 34 may be continuous so as to provide an annular bead engaging the bell throughout. It is notable that the front edge of ring 24 is shaped to brace and strengthen the rectangular housings 28, and forms diagonal horizontal webbing of the same type as seen in Fig. 2, where ribs 26 are upwardly inclined to the housing. The rear edge, as aforementioned, may be escalloped or annular, for bracing the lugs 34.

In use, the pipe sections 10, 11 are united and caulking means 12 and 13 applied in the usual manner. Gasket 14 and rings 15 and 19 may now be placed in position whereupon the clamp ring with arms 25 is applied. The position of the spigot section with respect to the bell section will determine the position and length of the arms 25. If the pipe sections are aligned in concentric relation, the clamp ring may be placed in position with the arms 25 extending, toward the spigot section, an equal amount from the ring 24. However, if the sections are eccentrically arranged, or disposed at an angle as seen in Fig. 1, the arms 25 will be slidably, and in this embodiment, radially adjusted to compensate for the greater or less distance which must be spanned from ring 24 to spigot section 11. It is evident that ring 24 will be closer to the spigot section at some points than at others, and for that reason the radial adjustment of the arms is provided so that the non-uniform distances can be bridged without impairing the efficiency of the clamp or seal.

By the provision of the radially adjustable arms 25, the screws 31 will be disposed equidistant from the spigot member 11, and the pressure from the ball tips 32 will be applied at the same location along the ring 19.

When the clamp ring is in position with the lugs 34 engaging the bell 10, the screws 31 may be turned to exert pressure on the ring 19 and tighten the parts in place. The flange 20 assists in centering the contact points 32 of the movable arms in a correct position for developing most uniform sealing pressures. The fact that the ring is spliced, as at 22, 23, instead of being separated or overlapped, insures that the gasket 14 is confined and protected where pipe diameters are varied. Likewise, the dovetailed joint transmits uniform ring pressures across the joint for any position of the joint with respect to the set screws 31. The rounded ends 32 of the screws 31 protect the threads from distortion when under pressure and reduce the diameter of the contact circle on the end of the screw. Internal flexural stresses, in the screw, are reduced.

Since the gasket 14 is of rectangular cross section and is completely confined, the uniform application of pressure by the ring 19 insures uniform deformation of the gasket with the attendant uniform sealing pressures against both the bell end as well as against the spigot end of the pipes. The shape of the gasket permits it to be spread or deformed equally in all directions, and prevents distortion from its true shape or impairment of the texture. Its shape also permits it to assume any eccentric position against the face of the bell end of the pipe as necessitated by the position of the adjoining spigot end. By applying pressure by means of ring 19, in a direct line, i. e., in a direction normal to the vertical gasket faces and parallel to the horizontal faces (Fig. 1), the most effective sealing results are obtained. The application of pressure in this manner, rather than at an acute angle to the gasket, in conjunction with the regular right angled shape of the gasket cross section, materially contributes to the sealing results.

The foregoing advantages are obtained with these parts, regardless of the degree or direction in which the spigot section is deflected with respect to the bell section. Assuming that the spigot section is disposed along line 35, the other limit of angularity permitted by the improvements, the beveled edge 21 of ring 19 is provided to accommodate such arrangement, without sacrificing the area of its contact with the gasket 14, or the pressure thereon. Accordingly, the bevel has sufficient slope to accommodate the greatest angles caused by pipe deflections and the full area of the ring face pressing against the gasket is effective.

After the pipes have been laid for some time they may move relative to each other, due to various agencies. Under such circumstances, the effectiveness of the seal will not be impaired, since the parts 14, 15, 19, 24 and 25 may shift with the pipe to compensate for the change without having their relations to one another or to the pipe sections altered to any material extent.

As aforementioned, the grooves 16 of the ring 15 contact the gasket and under pressure from the thrust of the set screws 31 and ring 19, the rubber of the gasket is pressed into the grooves, whereby any tendency of the collar or ring 15 to move transversely or longitudinally is resisted.

The effectiveness of the present improvements is attributable also to the improved manner of anchoring and tightening the clamp. This manner of employing the bell flange as a resistance for pressures exerted by the set screws 31 directly onto the sealing members is broadly described and claimed in the said copending application. Essentially the clamp therein comprises a one piece structure extending from the bell flange to the spigot member where the set screws are mounted in alignment with the sealing members. The advantages of that structure and the favorable distribution and application of the pressure, have been embodied herein, with certain improvements, in an adjustable clamp for use with angularly or eccentrically arranged pipe sections.

It is noteworthy that the aperture 29 in the clamp ring 24 is of sufficient length so that a firm purchase is effected between the ring 24 and arm 25. Accordingly, when the position of the arm is determined, the screw may be tightened, and the compression on the ring 19 and gasket 14 is applied as by a unitary structure effective from lug 34 through rib 27, housing 28, arm 25 and screw 31. The application of the pressure by the screws to the best advantage, is insured by curving the inner ends of the arms, as at 33. These ends are so shaped as to maintain a uniform distance between the outer periphery of the spigot section and the points of application on the ring 19 of the contact points 32 of the screws about the pipe for any eccentricity or deflection of the pipe sections.

It will be apparent from the description thus far, that the improvements may be used with pipes eccentrically disposed, whether deflected or not. In situations of that nature, the arms 25 will obviously be adjusted so as to be shorter on one side and longer on the other side of the eccentrically arranged pipe sections. The functioning of the parts will be the same as heretofore set forth.

Referring to the form of the improvements in Figs. 3 and 4, it is seen that the elements are substantially the same except for the clamp ring and arms. In this form, the clamp ring 40 having the circumferential stiffening ribs 41, has the arm housings 42 horizontally disposed. These housings are cylindrical in form and serve to rigidly hold the arms 43 in place against the thrust of the screw 31. Lugs 34 are located under each housing behind the flange or rim of the bell section and hold the entire ring in place at the end of the pipe bell and resist the longitudinal sealing forces.

The tubular housing 42 may be open at both ends, the fore opening being unrestricted, while the rear opening is restricted to the form of a vertically disposed rectangular slot 44. This port accommodates a correspondingly shaped T-head lug or lock 45 on the arm 43. As illustrated, the arm 43 is substantially right angled, although it may take other forms. One end of the arm is equipped with the pressure screw 31, so that the total direct pressure can be applied on the gasket for sealing, as in the form first described. The horizontally disposed portion of arm 43 is preferably provided with upper and lower cylindrical or curved faces for providing a close and nice fit with the walls of housing 42, while the other end is reduced in cross section to provide the T-head 45. One or more lugs 46 are provided in the tubular chamber defined by housing 42 in such a position as to be engaged by the arm 43 and prevent its movement therebeyond.

When the arm 43 is assembled with the clamp ring 40, the arm is held with the free end in a horizontal position, the T-head 45 being thus brought into vertical position. The arm may now be inserted axially through housing 42, until T-head 45 passes through slot 44, after which the arm may be rotated thus bringing the lock 45 to horizontal position and the free end carrying the screw 31, to vertical position (Fig. 4). The T-head lock 45 as seen in Fig. 5, serves to retain the arm from removal from the ring 40 while in operative position.

It is apparent from the foregoing that the arm 43 is swivelled or journalled in the clamp ring 40, so that it may be rotated arcuately and radially with respect to the bell and spigot sections. While only a small portion of the embodiment is illustrated, it is understood that the ring is provided at spaced points with a suitable number of slidable arms 43.

In use, the pipe sections may be deflected, as illustrated in Fig. 3, in which event the arm 43 may be vertically disposed with the screw 31 engaging the ring 19, as seen in full lines in Figs. 3 and 4. At other portions of the joint, where the pipes are not deflected to such a degree, the arms 43 may be foreshortened by turning them to a suitable position as seen in dotted lines, Fig. 4. The position of each arm about the clamp will, of course, be governed by the relative position of the pipe sections 10 and 11. Regardless of the position of the arms, however, the pressure on the ring and gasket will be effectively exerted. It is evident that the forces employed and the results attained will be substantially as outlined with respect to the form first described.

In effecting a seal of this type it is preferable that the points where pressure is exerted by screws 31 on ring 19, be evenly spaced. To this end, the lugs 46 are so located that the arms 43 must all be swung in the same direction. Referring to Fig. 4, the arm may swing from full line position to the left, but the lug 46, prevents it from being swung to the right. This feature prevents adjacent arms from being swung toward each other and their contact points 32 from being close together, while adjoining ones may be swung in an opposite direction, thereby leaving certain spaces along ring 19 between contact points, of greater extent than others. This possibility is prevented however, in the present improvements by the provision of lug 46, and the arms 43 are thus limited to a definite operating range and a more uniform spacing of the contact points along the pressure ring is obtained.

The modified form in Fig. 6 is similar in many respects to the form of Figs. 3 and 4. In this form the clamp ring 40 has tubular housings 52 open at both ends. The swivel arm 53 disposed therein has its lower extremity provided with a contact point 54, while the other end is reduced in size and threaded at 55 to receive the nut 56 by which the arm and clamp is tightened. In this form, the arms 53 may be swung in the same fashion as illustrated in Fig. 4, and will function in a similar manner.

Figure 12:
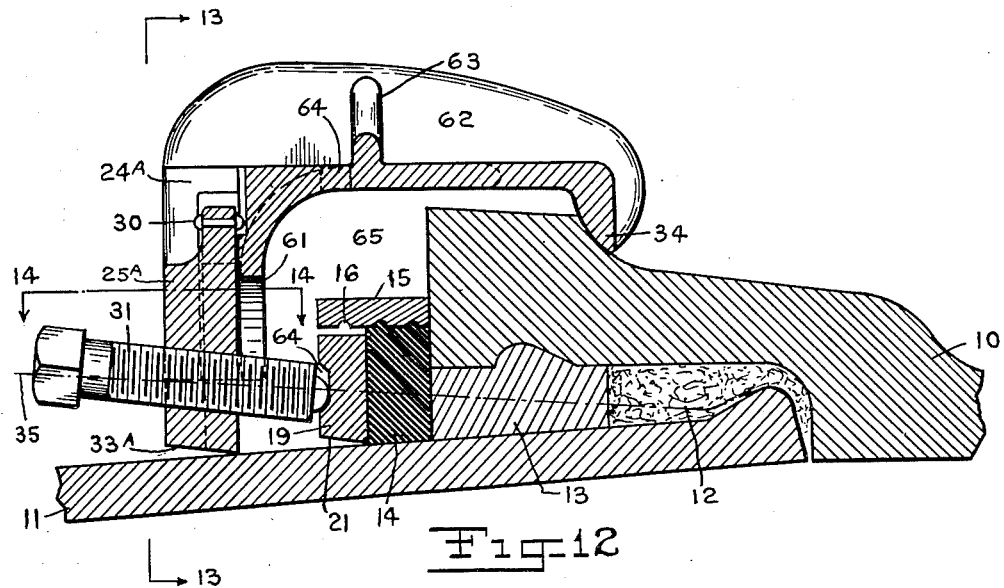
Fig. 12 is a view similar to Fig. 1, illustrating a further modified form.
Figure 13:
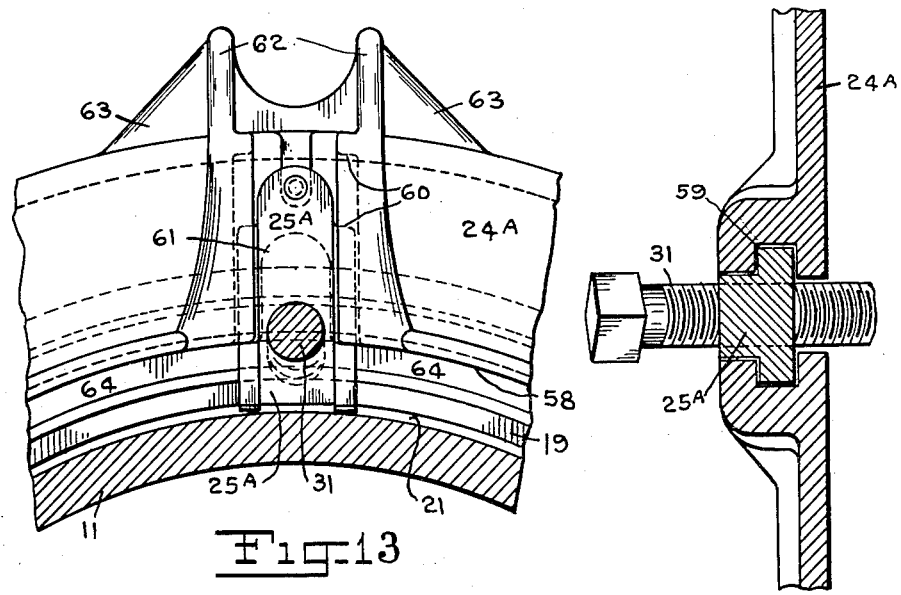
Fig. 13 is an end elevation of the structure of Fig. 12, looking along line 13—13.
Figure 14:
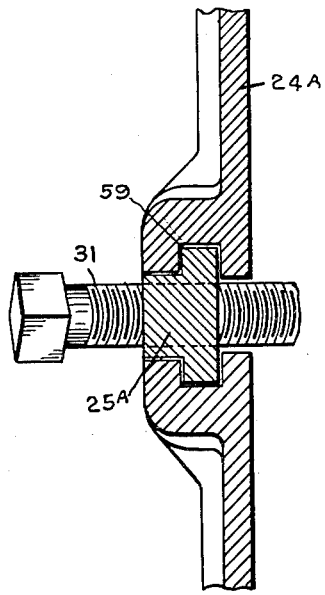
Fig. 14 is a section on line 14—14 of Fig. 12.

The modified form illustrated in Figs. 12 to 14, resembles the form of Figs. 1 and 2, as well as that of the aforementioned co-pending application. In this embodiment the ring member 24A has the form of a housing extending horizontally from the bell section 10, over and beyond the sealing elements, whence it extends radially toward the spigot section 11, as in the co-pending application. As illustrated, the inner edge 58 of the housing stops short of the spigot section 11, so as to allow use of the housing with deflected and eccentrically arranged pipe sections, as well as with straightaway and concentrically disposed sections.

A radially disposed T-shaped slot or aperture 59 accommodates a correspondingly shaped slidable arm 25A, whose radial movement is limited by stud 30, and cooperating shoulders 60. As in the embodiment of Fig. 1, the slidable arms are provided with the screws 31 for exerting pressure on the ring 19. The housing wall is cut away at 61 to permit free passage of screw 31, in any position of arm 25A. The housing 24A is suitably reinforced by transverse and circumferential ribs 62, 63, which cooperate, where they intersect, to brace and strengthen the housing in the nature of a backbone in the regions where the force and pressure of the screw is applied.

The lower extremity 33A of the adjustable arm 25A, is beveled, in contrast to the rounded end of the other forms. Either form of tip for the slidable arms, may be employed in all the embodiments.

The assembly and application of the parts is similar to that of the device of Figs. 1 and 2. In the form of Figs. 12 to 14, however, a filling aperture 64 is provided for the introduction of a plastic composition which may congeal after application. It is noteworthy that the housing 24A provides an annular channel or cavity 65 into which this compound is poured, whereupon it becomes set and completely envelops the packing elements. A temporary liner or collar of some sort may be used to close the space between housing edge 58 and the section 11, while the plastic compound is applied. This collar may then be removed after the mass becomes set. Further details of this method of sealing the joint may be had upon reference to the said co-pending application.

It is noteworthy that the clamp rings and arms, in all the embodiments, reach around from the flange or rim of the bell section to the spigot section and pressure ring. In spanning this space, the parts may be substantially of right angled form, or may take other forms. Furthermore, the parts are preferably designed and formed, so as to be slightly spaced from and over the parts 14, 15 and 19, and spaced from the ends of the bell and spigot sections. This spacing feature, as in the case of the copending application, affords an opportunity for the clamp and sealing members to move or shift, without becoming dislodged, in the event the pipes shift position after having been laid. This so-called flexible clamp or joint provided by the present improvements, therefore retains its effectiveness and its pressure-exerting position at the time of application as well as during extended use, which may be attended by changes of position. The faculty of the present improvements to provide an effective seal and not to become dislodged, equally well under all conditions with or without personal attention or servicing, is of great importance in the art of piping gases.

A further feature of marked advantage resides in the ease in effecting replacements. The improvements lend themselves admirably to such servicing without the necessity of shutting off the flow of gas. For example, if a screw 31, or adjustable arm, or a sealing member becomes injured and useless, they may be replaced, in the present invention, without interrupting the gas pressure.

It will be noted upon reference to Figs. 1, 3, 6, 10 and 12 that the angle defined by spigot sections 11 and line 35, designates the operating limits within which the pipes may be deflected and the general range within which the present improvements are adaptable for use. It is understood however that the indicated range is illustrative only, and that the improvements may be designed for use with pipes of a greater angle of deflection or with pipes of unequal exterior and interior diameters. In Fig. 1, the operating limits of the arms 25 are indicated by showing the member in full and dotted lines, while the positions similarly indicated for arms 43 in Fig. 4, designate the operating limits of the journalled arms in that embodiment, as well as for the forms of Figs. 6 and 10.

Various adaptations of the novel principles disclosed in the present improvements may be devised, it being understood that the embodiments illustrated are merely exemplary. For example, the principle of this flexible clamp may be applied to conventional pipe joints and the separate clamp ring dispensed with. The housings 38, 42 or 52 may be made as an integral part of the bell member with the slidable arms and structure otherwise the same. Upon reference to Fig. 11, one such arrangement is illustrated. It will be seen that the housing 42A, similar to housing 42, is cast as an integral part of the bell section 10, while arm 43A is somewhat longer than arm 43. The members, assembly and functioning of the parts are otherwise the same as illustrated and described with respect to the form of Figs. 3 and 4.

The present improvements therefore provide a clamp device for correcting leakage at joints, and provide an improved joint as well.

We claim:

1. A clamp for bell and spigot joints having packing elements, a ring member having a lug for engaging the bell section, an arm slidably mounted in said ring member, said arm having a portion extending toward the spigot section and terminating adjacent thereto, and a screw member threaded in said arm portion adjacent said packing elements.

2. A clamp for bell and spigot joints comprising a ring member having a lug for engaging the bell section, packing means surrounding said spigot section, an arm member loosely mounted in said ring member and extending toward said spigot section and adjacent said packing means and a screw associated with said arm portion and positioned for engaging said packing means.

3. A clamp for bell and spigot joints comprising a member fastened to the bell section, packing means surrounding said spigot section, an arm member mounted in said member, said arm member being radially adjustable with respect to the spigot section, and a screw associated with said arm and positioned for engaging said packing means.

4. A clamp for bell and spigot joints having packing means, a ring member having a lug engaging the bell section, an arm swivelly mounted in said member and having a portion movable arcuately with respect to the spigot section and a screw disposed in said portion and positioned for engaging said packing means.

5. A clamp for bell and spigot joints having packing means, a ring member having a lug engaging said bell section, said member extending beyond the end of the bell section, an adjustable arm mounted on said member and extending toward the spigot section, and means for engaging said packing means mounted on said arm.

6. A clamp for bell and spigot joints having packing means comprising a ring member having a lug for engaging the bell section, an arm journalled in said member and having an arcuately adjustable end engaging said packing means, and screw threaded means on the other end of said arm for retaining it in position.

7. The combination with pipes connected together by a bell and spigot joint, of a ring member having lugs engaging the bell section, arms swivelled in said member and having portions extending toward the spigot section, means for tightening the ring member in position and stop means for limiting the movement of said arms.

8. The combination with pipes connected together by a bell and spigot joint having the pipes at an angle to each other, of a detachable ring member having lugs engaging the bell section, individually adjustable arms disposed on said member at spaced points and having free ends extending toward said spigot section, and means on said free ends for securing said ring in position about the joint.

9. In a clamp for bell and spigot joints, a detachable ring portion adapted to engage the bell section, an arm swivelled in said portion and a screw carried by the free end of said arm.

10. In a clamp for bell and spigot joints, a detachable ring portion adapted to engage the bell section, a radially adjustable arm mounted on said portion and securing means carried by said arm.

11. In a clamp for bell and spigot joints, a detachable ring portion adapted to engage the bell section, an arm mounted on said portion, said arm having a portion adjustable radially with respect to the pipe sections and a screw on said arm.

12. In a clamp for bell and spigot joints, a ring member having a lug for frictionally engaging and gripping the bell section, an arm slidably mounted in said member and a screw extending through said arm.

13. In a clamp for bell and spigot joints, a detachable ring member having a lug for engaging the bell section, said member having an aperture, an arm removably mounted in said aperture and adapted for location in various positions of adjustment means for retaining said arm in said aperture and adjustable means on said arm for securing the ring member in position.

14. In a clamp for bell and spigot joints, a detachable ring portion having a lug adapted to engage the bell section, a movable arm associated with said portion, a member on said arm co-operating with said ring portion for maintaining said arm in position with respect to said ring and tightening means associated with said arm and spaced from said member.

15. In a pipe joint, packing means comprising an annular gasket, a keeper ring, having overlapping sections, surrounding said gasket, an annular groove in the inner periphery of said ring, a pressure ring engaging said gasket, said ring having a dovetail expansion joint, and the pressure ring having its exposed face recessed for accommodating means for exerting pressure.

16. In a device of the character described, a tubular housing associated with the bell section of a bell and spigot joint, an arm journalled in said housing and having a T-head retaining means, said arm being substantially right angled with the free end directed toward the spigot section, and securing means mounted in said arm.

17. A clamp for bell and spigot joints comprising an annular housing, a lug on said housing for engaging the bell section, said housing having a portion extending toward the spigot section and provided with a T-shaped slot, a correspondingly shaped arm slidably disposed in said slot and a screw threaded member mounted on said arm.

18. In a clamp for bell and spigot joints, a rigid member adapted to engage and grip the bell section by frictional contact, a housing in said member extending toward said spigot section, and an arm mounted in said housing and slidable relative thereto toward and away from said spigot section, and means for securing said elements in clamped position.

19. In a clamp for bell and spigot joints, a rigid member adapted to engage and grip the bell section by frictional contact, a movable arm co-operating with said member and having a portion substantially parallel with the end face of said bell section, said arm portion being slidable along a plane substantially parallel to said end face of the bell section and means for securing said elements in clamped position.

20. The combination with pipes connected together by a bell and spigot joint, a sealing device for said joint embracing the spigot member, a plurality of spaced adjustable arms extending toward said spigot member to points behind said sealing device, and having adjustable means for engaging said sealing device, and means secured to said bell section for supporting said adjustable arms.

FRANK A. ENGEL.
FRANK V. LAWRENCE.
FRANKLIN HUDSON.